(12) United States Patent
Regenor

(10) Patent No.: US 11,879,855 B2
(45) Date of Patent: Jan. 23, 2024

(54) MUON TOMOGRAPHY FOR 3D NONDESTRUCTIVE EXAMINATION

(71) Applicant: VeriTX Corp., Buffalo, NY (US)

(72) Inventor: James Allen Regenor, East Aurora, NY (US)

(73) Assignee: VeriTx Corp., Buffalo, NY (US)

( * ) Notice: Subject to any disclaimer, the term of this patent is extended or adjusted under 35 U.S.C. 154(b) by 457 days.

(21) Appl. No.: 17/349,579

(22) Filed: Jun. 16, 2021

(65) Prior Publication Data

US 2021/0389261 A1 Dec. 16, 2021

Related U.S. Application Data

(60) Provisional application No. 63/039,705, filed on Jun. 16, 2020.

(51) Int. Cl.
*G01N 23/046* (2018.01)
*G06T 19/00* (2011.01)
*G06T 15/08* (2011.01)

(52) U.S. Cl.
CPC .......... *G01N 23/046* (2013.01); *G06T 15/08* (2013.01); *G06T 19/006* (2013.01); *G01N 2223/205* (2013.01)

(58) Field of Classification Search
CPC ............ G01N 23/046; G01N 2223/205; G06T 15/08; G06T 19/006
See application file for complete search history.

(56) References Cited

U.S. PATENT DOCUMENTS

2020/0144023 A1* 5/2020 Borozdin ................ G01T 1/167

* cited by examiner

*Primary Examiner* — Nicole M Ippolito
*Assistant Examiner* — Hanway Chang
(74) *Attorney, Agent, or Firm* — Woods Oviatt Gilman LLP; Katherine H. McGuire, Esq

(57) ABSTRACT

A system for non-destructive examination of three-dimensional (3D) printed objects includes a muon source directs muon particles at and through the 3D object and a muon detector receives the muon particles from the muon source to produce a muon signal which is representative of the 3D object. A first computing device executes an algorithm to analyze the muon signal. The analysis comprises creating a 3D rendering of the 3D object based upon the muon signal; preparing a physics-based digital model of the 3D object; and comparing the 3D rendered object to the digital model to identify defects within the 3D object. An augmented reality (AR) device and a second computing device may communicate with the first computing device and receive the 3d rendered object and the digital model. This can used on earth, in space, on a moon or asteroid or another planet as muons occur naturally in these environments.

3 Claims, 2 Drawing Sheets

MUON TOMOGRAPHY FOR 3D NONDESTRUCTIVE EXAMINATION

BACKGROUND OF THE INVENTION

The present invention broadly relates to the use of muon tomography and more particularly relates to methods and apparatus and systems utilizing muon tomography to examine large structures and parts that are 3D printed during printing and/or after the printing is considered complete.

SUMMARY OF THE INVENTION

In a first embodiment, a 3D printed object, forging or casting is actively or passively shot with muons inside the build chamber for smaller parts or for larger builds in machines without a build chamber during the build process to determine the quality and condition of the part by checking designed internal features and checking for voids and defects within the object.

This process may work on polymers, metals, ceramics, concrete and fiber impregnated resins. The actual results may be analyzed and compared to the expected results and determine if voids or defects are present.

An algorithm then creates a rendering of the 3D printed object and determines if the build was successful and if the part was "good" (i.e., meets technical specifications). Machine learning may then be utilized to improve the build process.

Data can be uploaded in an Augmented Reality device or on a tablet for a quality inspector to see each rendering and pull the actual result from the production line, if necessary.

The information may also be recorded on a distributed ledger and/or through blockchain to provide data security, immutability and transparency.

In a second embodiment, a 3D printed object, forging or casting outside the build chamber post-production may be actively or passively shot with muons to determine the quality and condition of the part by checking designed internal features and checking for voids and defects within the object. The process may be used on earth or in space or on a moon or asteroid or planet. The process may be used on large and or small 3D printed objects, forgings or castings.

This process may work on polymers, metals, ceramics, concrete and fiber impregnated resins. The actual results may be analyzed and compared to the expected results and determine if voids or defects are present.

An algorithm then creates a rendering of the 3D printed object and determines if the build was successful and if the part was "good". Machine learning may then be utilized to improve the build process.

Data can be uploaded in an Augmented Reality device or on a tablet for a quality inspector to see each rendering and pull the actual result from the production line, if necessary.

The information may also be recorded on a distributed ledger and/or through blockchain to provide data security, immutability and transparency.

In a third embodiment, structures may be built with 3D printing and/or other techniques in the vacuum of space and on celestial and terrestrial bodies (e.g., the Moon, Mars, asteroids, comets, etc.) to construct space cities, factories, colonies and ships. These objects may require a nondestructive examination (NDE) inspection to insure quality and mechanical properties. Muon tomography can be used to perform NDE as muons occur naturally and can be harnessed for these inspections. The NDE utilizing muons can be used to determine the quality and condition of the part by checking designed internal features and checking for voids and defects within the object.

This process may work on polymers, metals, ceramics, and fiber impregnated resins. The actual results may be analyzed and compared to the expected results and determine if voids or defects are present.

An algorithm then creates a rendering of the 3D printed object and determines if the build was successful and if the part was "good". Machine learning may then be utilized to improve the build process.

Data can be uploaded in an Augmented Reality device or on a tablet for a quality inspector to see each rendering and pull the actual result from the production line, if necessary.

The information may also be recorded on a distributed ledger and/or through blockchain to provide data security, immutability and transparency.

DESCRIPTION OF THE DRAWING FIGURES

The above-mentioned and other features and advantages of this invention, and the manner of attaining them, will become apparent and be better understood by reference to the following description of the invention in conjunction with the accompanying drawing, wherein.

DETAILED DESCRIPTION OF A PREFERRED EMBODIMENT

Figure 1:
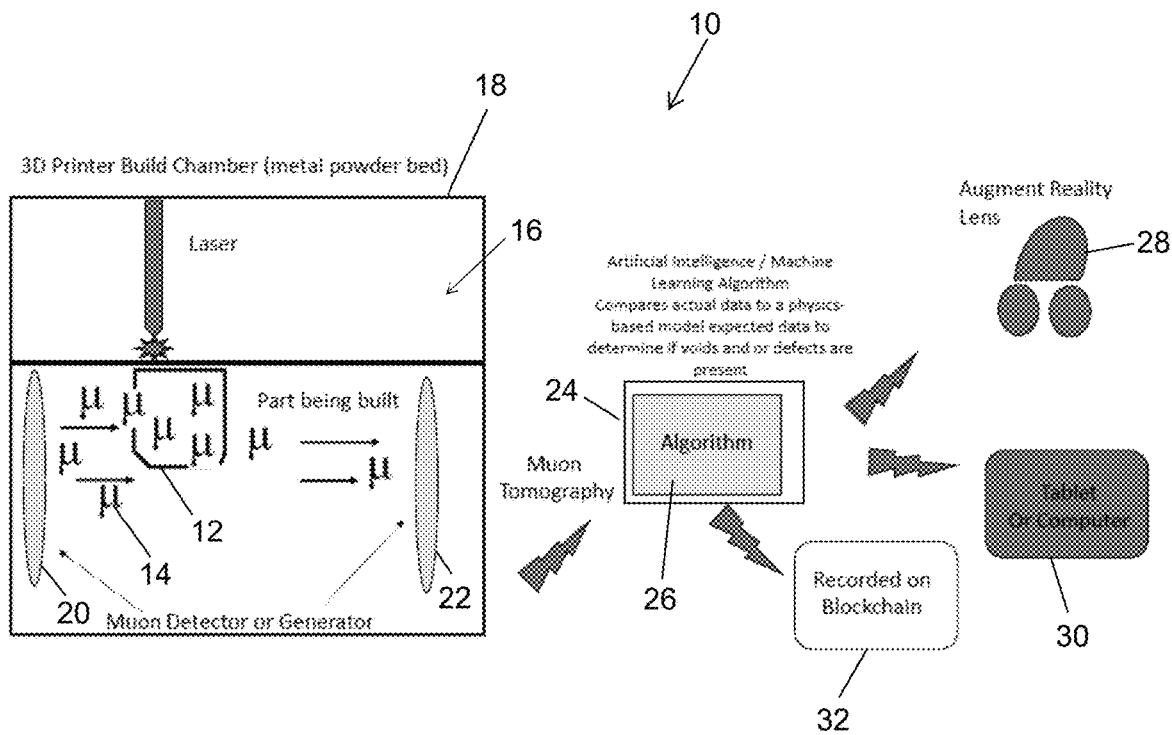
FIG. 1 is a simplified diagrammatic view of an apparatus, method and system in accordance with a first embodiment of the invention.

In a first embodiment 10 seen in FIG. 1, a 3D printed object, forging or casting 12 is actively and/or passively shot with muons 14 inside the build chamber 16 of metal powder 3D printer 18 during the build process. Muons 14 may originate at a muon generator 20 and pass through object 12 as it is being formed by laser sintering of the metal powder before being detected by muon detector 22. Thus, muon tomography may be used to determine the quality and condition of the part by checking designed internal features and checking for voids and defects within the object 12. While shown in FIG. 1 as a metal powder 3D printer, it should be understood by those skilled in the art that this process may also work on polymers, metals, ceramics, concrete and fiber impregnated resins.

A computing device 24 including a memory and processor may execute an algorithm 26 which creates a digital rendering of the 3D printed object based upon the muon tomography scan. The 3D rendered results are analyzed and compared to a physics-based digital model of expected results and determine if voids or defects are present and determine if the build was successful and if the part is "good" or should be reprinted. Computing device 24 may further employ machine learning algorithms that can be utilized to improve the build process.

The 3D rendering data may also be uploaded in an Augmented Reality device 28 or on a tablet computer 30 for a quality inspector to see the 3D rendered object and pull defective objects from the production line if necessary. All information relating to the printing process, muon tomography and 3D rendering may be recorded in distributed ledger or blockchain 32 to provide data security, immutability and transparency.

Figure 2:
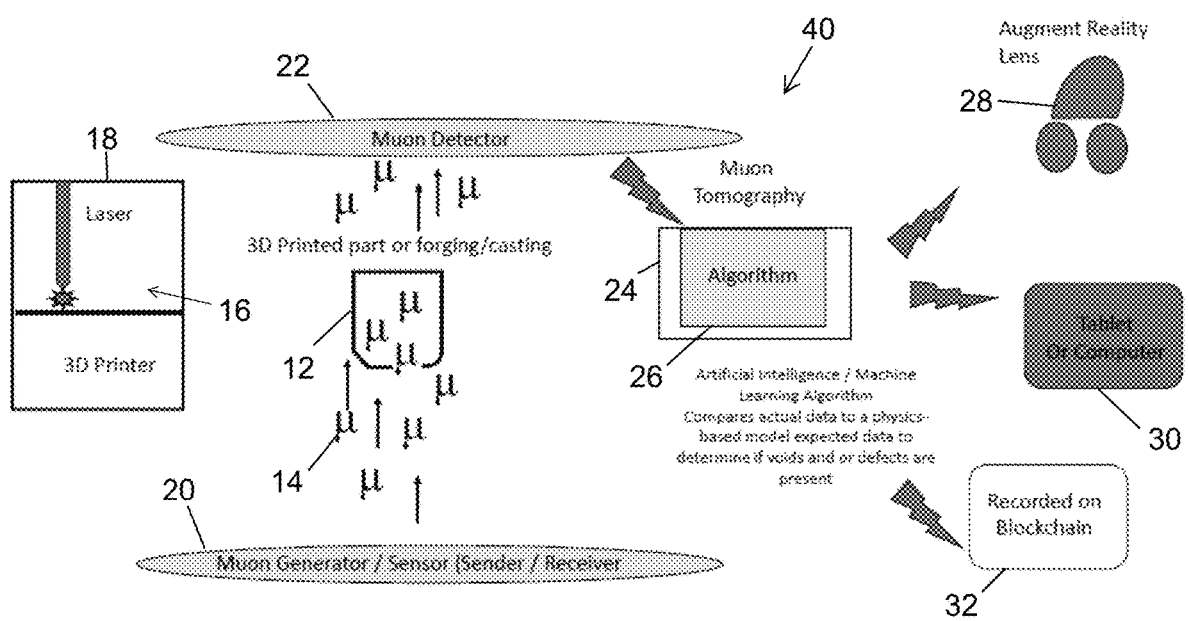
FIG. 2 is a simplified diagrammatic view of an apparatus, method and system in accordance with a second embodiment of the invention.

A second embodiment 40, shown generally in FIG. 2, is identical to first embodiment 10 except that the muon generator/detector pair 20/22 is located outside the build chamber 16. As a result, muon tomography is conducted post-production to determine the quality and condition of the part by checking designed internal features and checking for voids and defects within the object. Second embodiment 40 may be used on large/and or small 3D printed objects, forgings or castings.

Figure 3:
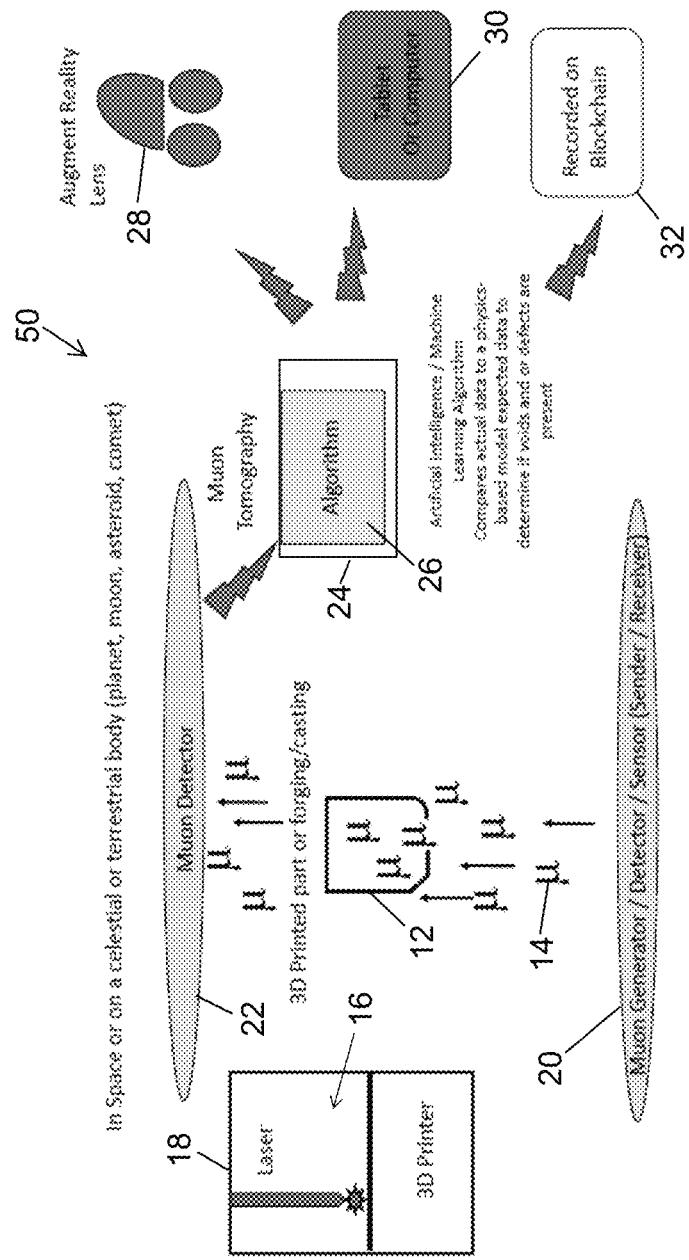
FIG. 3 is a simplified diagrammatic view of an apparatus, method and system in accordance with a third embodiment of the invention.

Third embodiment 50, shown in FIG. 3, is similarly analogous to embodiments 10 and 40. However, objects/structures 12 are built with 3D printing and or other techniques in the vacuum of space and/or on celestial and terrestrial bodies (e.g., the Moon, Mars, asteroids, comets, etc.). It is envisioned that these objects/structures 12 may be used to construct extra-planetary cities, factories, colonies and ships. As such, these objects require an NDE inspection to insure quality and mechanical properties. Muon tomography can be used to perform NDE as muons occur naturally and can be harnessed for these inspections.

While the apparatus, methods and systems have been shown and described with reference to certain preferred embodiments thereof, it will be understood by those skilled in the art that various changes in form and details may be made therein without departing from the spirit and scope of the invention as defined by the claims which follow.

What is claimed is:

1. A system for non-destructive examination of three-dimensional (3D) objects, the system comprising:
   a) a muon source arranged to direct muon particles at and through the 3D object;
   b) a muon detector arranged to receive the muon particles from the muon source to produce a muon signal wherein the muon signal is representative of the 3D object; and
   c) a first computing device with a memory and a processor executing an algorithm to analyze the muon signal, wherein in the analysis comprises:
      i) creating a 3D rendering of the 3D object based upon the muon signal;
      ii) preparing a physics-based digital model of the 3D object; and
      iii) comparing the 3D rendered object to the digital model to identify defects within the 3D object.

2. The system of claim 1 further comprising:
   e) one or both of an augmented reality (AR) device and a second computing device communicatively coupled to the first computing device and configured to receive one or both of the 3d rendered object and the digital model.

3. The system of claim 2 further comprising:
   f) a distributed ledger or blockchain network comprising at least the first computing device and one or more of the AR device and the second computing device.

* * * * *